US012591978B2

(12) United States Patent　　　　(10) Patent No.: US 12,591,978 B2
Hama　　　　　　　　　　　　　　(45) Date of Patent: Mar. 31, 2026

(54) DETERMINATION METHOD FOR DETERMINING IDENTITY OF PERSON DEPENDING ON MOVEMENT OF POSITIONS IN SPECIFIED IMAGE REGION, NON-TRANSITORY COMPUTER-READABLE STORAGE MEDIUM, AND INFORMATION PROCESSING APPARATUS

(71) Applicant: Fujitsu Limited, Kawasaki (JP)

(72) Inventor: Soichi Hama, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 207 days.

(21) Appl. No.: 18/347,340

(22) Filed: Jul. 5, 2023

(65) Prior Publication Data

US 2023/0342947 A1　　Oct. 26, 2023

Related U.S. Application Data

(63) Continuation of application No. PCT/JP2021/005432, filed on Feb. 15, 2021.

(51) Int. Cl.
G06T 7/20　　　　(2017.01)
G06V 10/25　　　(2022.01)
*G06T 7/10*　　　　(2017.01)
*G06V 10/74*　　　(2022.01)
*G06V 40/18*　　　(2022.01)

(52) U.S. Cl.
CPC ............... G06T 7/20 (2013.01); G06V 10/25 (2022.01); *G06T 7/10* (2017.01); *G06T 2207/30201* (2013.01); *G06V 10/761* (2022.01); *G06V 40/193* (2022.01)

(58) Field of Classification Search
None
See application file for complete search history.

(56) References Cited

U.S. PATENT DOCUMENTS

| 9,595,116 | B2 * | 3/2017 | Kawamura | ............. G06T 7/269 |
| 2007/0098303 | A1 * | 5/2007 | Gallagher | ............. G06V 40/16 |
| | | | | 707/E17.02 |
| 2007/0229663 | A1 * | 10/2007 | Aoto | ................... G08B 21/043 |
| | | | | 348/155 |

(Continued)

FOREIGN PATENT DOCUMENTS

JP　　　2001-126091 A　　5/2001
JP　　　2005-259049 A　　9/2005

(Continued)

OTHER PUBLICATIONS

Machine Translation in English of JP Pub 2010225118 to Nishiyama et al.*

(Continued)

*Primary Examiner* — Haris Sabah
(74) *Attorney, Agent, or Firm* — ArentFox Schiff LLP

(57) ABSTRACT

A determination method for a computer to execute a process includes acquiring a captured image that is captured by a camera and includes an image area of a person; specifying an image area other than the image area of the person from the acquired captured image; and determining whether the captured image is obtained by capturing a display object of the person according to a distribution of motions of a plurality of positions included in the specified image area.

12 Claims, 11 Drawing Sheets

(56)          References Cited

U.S. PATENT DOCUMENTS

| 2016/0277397 A1 | 9/2016 | Watanabe |
| 2017/0206441 A1* | 7/2017 | Miyano ................... G06T 7/251 |
| 2021/0073364 A1 | 3/2021 | Sakai |

FOREIGN PATENT DOCUMENTS

| JP | 2006-099614 A | 4/2006 |
| JP | 2006-330936 A | 12/2006 |
| JP | 2008-000464 A | 1/2008 |
| JP | 2008-090452 A | 4/2008 |
| JP | 2010-225118 A | 10/2010 |
| JP | 2016-152029 A | 8/2016 |
| JP | 2016-173813 A | 9/2016 |
| WO | WO 2009/107237 A1 | 9/2009 |
| WO | WO 2009/110323 A1 | 9/2009 |
| WO | WO 2019/151368 A1 | 8/2019 |

OTHER PUBLICATIONS

Japanese Office Action issued in Japanese Patent Application No. 2022-581139, dated Feb. 20, 2024.
Extended European Search Report (EESR) issued in corresponding European Patent Application No. 21925681.5, dated Mar. 4, 2024.
Zhao, H., et al., "Pyramid Scene Parsing Network," Proceedings of the IEEE Conference on Computer Vision and Pattern Recognition (CVPR), pp. 2881-2890, Apr. 27, 2017.
Liu, W., et al., "SSD: Single Shot MultiBox Detector," European Conference on Computer Vision (ECCV) 2016, Springer International Publishing, pp. 21-37, Dec. 29, 2016.
Redmon, J., et al., "You Only Look Once: Unified, Real-Time Object Detection," 2016 IEEE Conference on Computer Vision and Pattern Recognition (CVPR), pp. 779-788, May 9, 2016.
Zhang, K., et al., "Joint Face Detection and Alignment using Multi-task Cascaded Convolutional Networks," IEEE Signal Processing Letters (SPL), vol. 23, Issue 10, pp. 1499-1503, Oct. 2016.
Farneback, G., "Two-Frame Motion Estimation Based on Polynomial Expansion," In Proceedings of the 13th Scandinavian Conference on Image Analysis (SCIA 2003), pp. 363-370, 2003.
International Search Report and Written Opinion in corresponding International Patent Application No. PCT/JP2021/005432 mailed May 25, 2021.
Office Action of European Patent Application No. 21925681.5, dated Dec. 16, 2025.
Chinese Office Action mailed Dec. 23, 2025, for corresponding Chinese Patent Application No. 202180091227.X, with Machine Translation.

* cited by examiner

MAGNITUDE OF DIFFERENCE
VECTOR BETWEEN PERSON AREA
AND BACKGROUND AREA

ACTUAL OBJECT
(PERSON)

DISPLAY OBJECT

MAGNITUDE OF DIFFERENCE
VECTOR BETWEEN
BACKGROUND AREA AND
PERIPHERAL AREA

DISPLAY OBJECT

ACTUAL OBJECT (PERSON)

FIG. 4

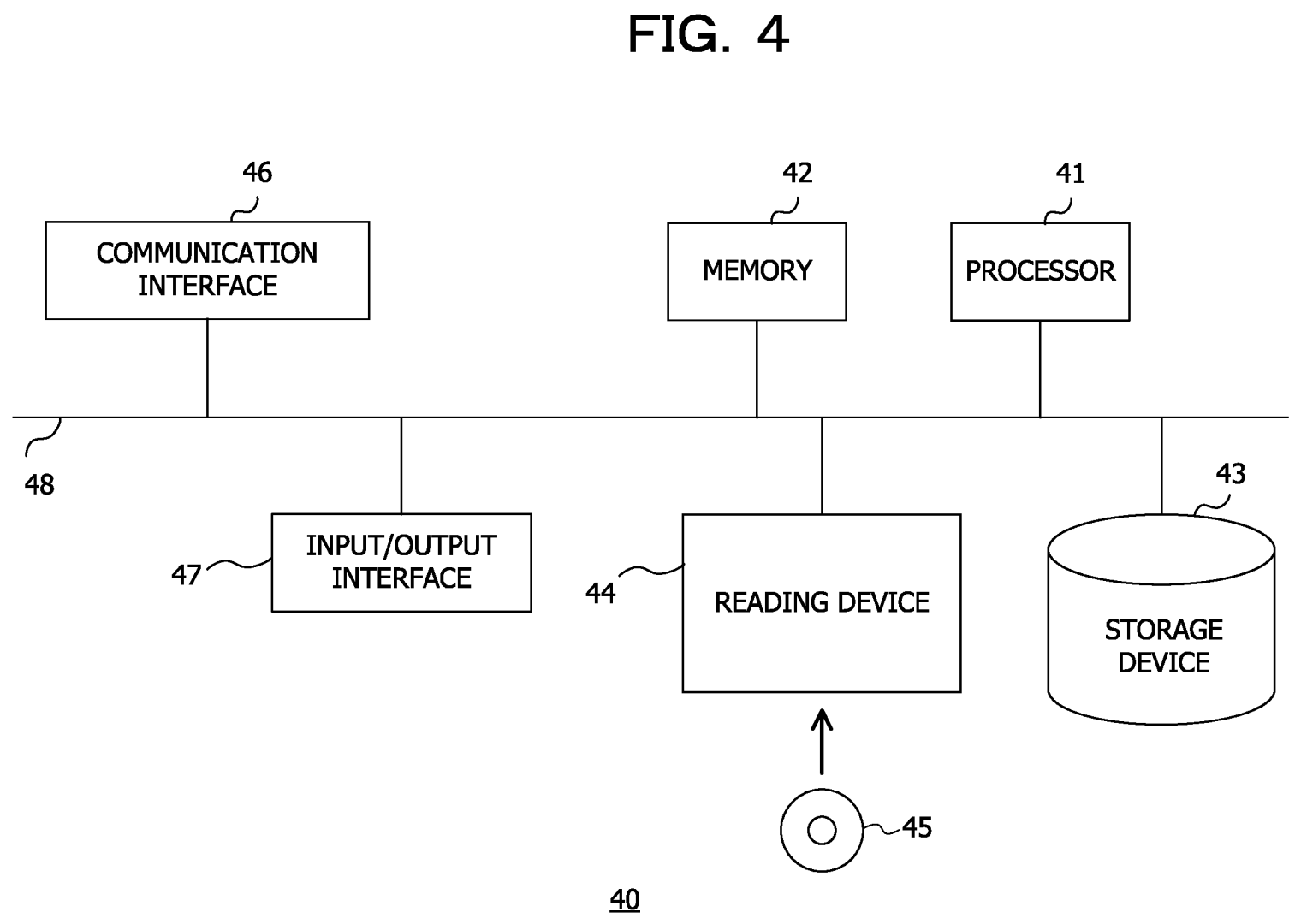

PROCESSOR 41

MEMORY 42

STORAGE DEVICE 43

READING DEVICE 44

45

COMMUNICATION INTERFACE 46

INPUT/OUTPUT INTERFACE 47

48

40

1

DETERMINATION METHOD FOR DETERMINING IDENTITY OF PERSON DEPENDING ON MOVEMENT OF POSITIONS IN SPECIFIED IMAGE REGION, NON-TRANSITORY COMPUTER-READABLE STORAGE MEDIUM, AND INFORMATION PROCESSING APPARATUS

CROSS-REFERENCE TO RELATED APPLICATION

This application is a continuation application of International Application PCT/JP2021/005432 filed on Feb. 15, 2021 and designated the U.S., the entire contents of which are incorporated herein by reference.

FIELD

The present invention relates to an image determination method, a storage medium, and an information processing apparatus.

BACKGROUND

A biometric authentication technology is a technology of performing identity verification by using biometric features such as fingerprints, faces, and veins. In the biometric authentication technology, a biometric feature acquired in a scene where verification is needed is compared (collated) with a biometric feature registered in advance, and it is determined whether or not the biometric features match, thereby performing identity verification.

A face authentication technology, which is one of the biometric authentication technologies, has attracted attention as a method of enabling identity verification in a non-contact manner. The face authentication technology is used for various purposes such as access management of a terminal for personal use such as a personal computer (PC) or a smartphone, management of entrance and exit, and identity verification at a boarding gate at an airport.

Unlike information used as a biometric feature in another biometric authentication technology such as fingerprint authentication or palm vein authentication, information of a face image used as a biometric feature in this face authentication technology may also be acquired by image capturing with a general camera without using a special sensor. Furthermore, face images are often published in the Internet through a social networking service (SNS) or the like. Thus, there is a concern that an unauthorized act in which a stranger impersonates a person in question is performed by presenting, to a camera, a photograph obtained by printing a public face image or a screen of a smartphone or the like in which the face image is displayed. Therefore, some technologies have been proposed for determining whether a captured image captured by a camera is obtained by capturing an actual person (a person actually present at an image capturing place) or by capturing a display object of the person such as a photograph of the person or a display screen or the like in which the person appears.

It is difficult to distinguish at a glance between an image obtained by capturing a photograph in which a face of a person in question appears or a display screen in which the face of the person in question appears and a face image of the person in question registered in advance as authentication information. Therefore, a method of capturing a characteristic of an object to be captured by using an infrared image acquired by using an infrared camera or three-dimensional information acquired by using a depth camera or the like has been proposed (see, for example, Patent Documents 1 to 3).

Furthermore, in a case where a captured image is obtained by capturing a display object of a person, it is not possible for such a display object to respond to a request on the spot. By using this, a technology of causing a person to be authenticated to input a predetermined motion, a technology of observing a response of a person to be authenticated to a display of a device, and moreover, a technology of determining whether or not a person is a living body by detecting a natural motion (blinking or the like) of the person have been proposed (see, for example, Patent Documents 4 to 9).

Moreover, some technologies of determining whether or not a captured image is obtained by capturing an actual person by using a feature of an image area of the person or a feature of an image area other than the image area of the person (background image area) in the captured image have been proposed. More specifically, for example, a technology of determining an object as a non-living body in a case where there is a variation of a predetermined value or more in a feature for a background area that is an area other than a person area in a captured image has been proposed. Furthermore, for example, a technology of determining whether an object to be captured is a photograph or a human by using similarity of each motion feature between a face area and a background area in a captured image has also been proposed (see, for example, Patent Documents 10 to 12).

In addition, some technologies used in image determination have been proposed.

For example, a technology of detecting an image area of an object or an image area of a human face from a captured image has been proposed (see, for example, Non-Patent Documents 1 to 4).

Furthermore, for example, a technology of extracting a motion of an image by using an optical flow obtained from a change in luminance gradient of each pixel constituting time-series images has been proposed (see, for example, Non-Patent Document 5).

CITATION LIST

Patent Document

Patent Document 1: International Publication Pamphlet No. WO 2009/107237, Patent Document 2: Japanese Laid-open Patent Publication No. 2005-259049, Patent Document 3: International Publication Pamphlet No. WO 2009/110323, Patent Document 4: Japanese Laid-open Patent Publication No. 2016-152029, Patent Document 5: International Publication Pamphlet No. WO 2019/151368, Patent Document 6: Japanese Laid-open Patent Publication No. 2008-000464, Patent Document 7: Japanese Laid-open Patent Publication No. 2001-126091, Patent Document 8: Japanese Laid-open Patent Publication No. 2008-090452, Patent Document 9: Japanese Laid-open Patent Publication No. 2006-330936, Patent Document 10: Japanese Laid-open Patent Publication No. 2010-225118, Patent Document 11: Japanese Laid-open Patent Publication No. 2006-099614, and Patent Document 12: Japanese Laid-open Patent Publication No. 2016-173813.

Non-Patent Document

Non-Patent Document 1: Hengshuang Zhao et al., "Pyramid Scene Parsing Network", Proceedings of the IEEE Conference on Computer Vision and Pattern Recognition (CVPR), 2017, Non-Patent Document 2: Wei Liu et al., "SSD: Single Shot MultiBox Detector", European Conference on Computer Vision (ECCV) 2016, Springer International Publishing, 2016, p. 21-37, Non-Patent Document 3: Joseph Redmon et al., "You Only Look Once: Unified, Real-Time Object Detection", 2016 IEEE Conference on Computer Vision and Pattern Recognition (CVPR), 2016, p. 779-788, Non-Patent Document 4: Kaipeng Zhang et al., "Joint Face Detection and Alignment using Multi-task Cascaded Convolutional Networks", IEEE Signal Processing Letters (SPL), Volume 23, Issue 10, October 2016, p. 1499-1503, and Non-Patent Document 5: Gunnar Farneback, "Two-Frame Motion Estimation Based on Polynomial Expansion" In Proceedings of the 13th Scandinavian Conference on Image Analysis (SCIA 2003), 2003, p. 363-370.

SUMMARY

According to an aspect of the embodiments, a determination method for a computer to execute a process includes acquiring a captured image that is captured by a camera and includes an image area of a person; specifying an image area other than the image area of the person from the acquired captured image; and determining whether the captured image is obtained by capturing a display object of the person according to a distribution of motions of a plurality of positions included in the specified image area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating a hardware configuration example of a computer;

DESCRIPTION OF EMBODIMENTS

Figure 1:
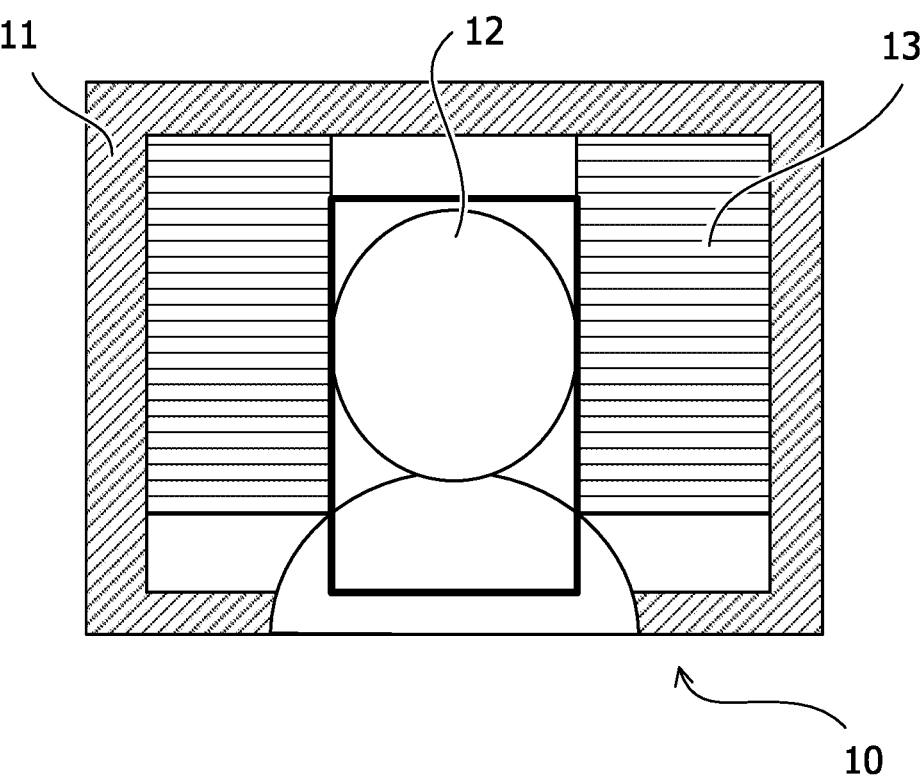
FIG. 1 is a diagram for describing each image area of a captured image.

An image captured at the time of performing face authentication may be blurred. Such blurring occurs, for example, in a case where a laptop is placed on a knee and used in a vehicle such as a train, in a case where a camera shakes due to surrounding vibration because fixing of the camera is not robust, or the like. When such blurring caused by a camera shake at the time of image capturing exists in a captured image, accuracy of determination as to whether or not the captured image is obtained by capturing a display object of a person may be deteriorated.

As described above, the technology of determining an object as a non-living body in a case where there is a variation of a predetermined value or more in a feature for a background area that is an area other than a person area in a captured image has been proposed. This technology focuses on a fact that the feature of the background area hardly varies in a case where the captured image is obtained by capturing an actual person, and performs the determination described above by detecting such variation. However, this technology detects a variation in the feature of the background area also from a captured image in which blurring exists as described above. Thus, in a case where there is blurring in a captured image, this technology may erroneously determine an object as a non-living body even when the object is a living body.

Furthermore, as described above, the technology of determining whether an object to be captured is a photograph or a human by using similarity of each motion feature between a face area and a background area in a captured image has also been proposed. This technology focuses on a fact that motions of the face area and the background area are linked in the captured image obtained by capturing a photograph in which a person appears, and performs the determination described above by detecting the linkage. However, in a captured image in which blurring exists as described above, motions of a face area and a background area are linked. Thus, in a case where there is blurring in a captured image, this technology may erroneously determine that the captured image is obtained by capturing a photograph even when the captured image is obtained by capturing an actual person.

In one aspect, an object of the present invention is to improve accuracy of determination as to whether or not a captured image is obtained by capturing a display object of a person.

According to one aspect, accuracy of determination as to whether or not a captured image is obtained by capturing a display object of a person is improved.

Hereinafter, an embodiment will be described in detail with reference to the drawings.

In the present embodiment, it is determined whether or not a captured image is obtained by capturing a display object of a person according to a distribution situation of motions of a plurality of positions included in an image area other than an image area of the person in the captured image captured by a camera. This method will be described.

In the present embodiment, first, each image area is detected from a captured image captured by a camera.

FIG. 1 is a diagram for describing each image area of a captured image 10. In the present embodiment, each image area of a peripheral area 11, a person area 12, and a background area 13 are detected from the captured image 10.

The peripheral area 11 is an area of an outer peripheral portion of the captured image 10, and is an annular area having an edge of the captured image 10 as an outer periphery. Furthermore, both the person area 12 and the background area 13 are areas surrounded by an inner periphery of the peripheral area 11. Among these, the person area 12 is an image area representing a person. On the other hand, the background area 13 is an area other than the person area 12, and is an area representing an object other than the person.

In a case where the captured image 10 is obtained by capturing an actual person, the person is displayed in the person area 12, and an actual background of the person at the time of capturing the captured image 10 is displayed in both the background area 13 and the peripheral area 11. Note that, in the peripheral area 11, a peripheral scene for the background displayed in the background area 13 is displayed.

On the other hand, in a case where the captured image 10 is obtained by capturing a display object of the person, an image displayed in the display object at the time of capturing the captured image 10 is displayed in both the person area 12 and the background area 13, and a peripheral scene of the display object at the time of capturing the captured image 10 is displayed in the peripheral area 11. Note that, the image of the person represented in the display object is displayed in the person area 12, and the image of the background represented together with the person in the display object is displayed in the background area 13.

In a case where a camera shake occurs at the time of capturing the image of the actual person, motions of the images are synchronized between the peripheral area 11 and the background area 13 in both of which the actual background of the person is displayed. On the other hand, in the person area 12 in which the person is displayed, the motion of the image is not synchronized with that in the background area 13. On the other hand, in a case where a camera shake occurs at the time of capturing the image of the display object of the person, the motions of the images are synchronized between the person area 12 and the background area 13 in both of which a display content of the display object is displayed. On the other hand, in the peripheral area 11 in which the peripheral scene of the display object is displayed, the motion of the image is not synchronized with that in the background area 13. Such states of synchronization and asynchronization of the motions of the respective image areas of the captured image 10 in a case where a camera shake occurs will be described with reference to FIGS. 2A and 2B.

Figure 2A:
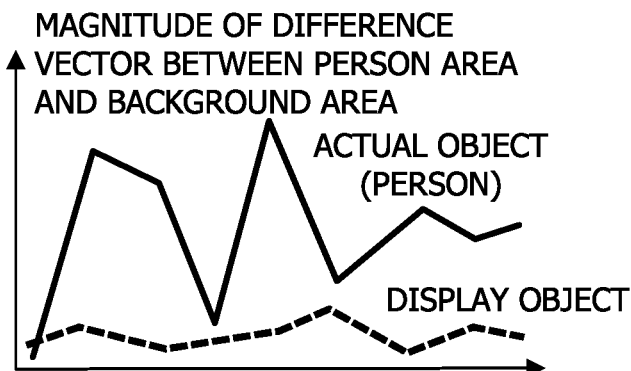
FIG. 2A is a diagram (part 1) for describing states of synchronization and asynchronization of motions of the respective image areas of the captured image in a case where a camera shake occurs at the time of image capturing.
Figure 2B:
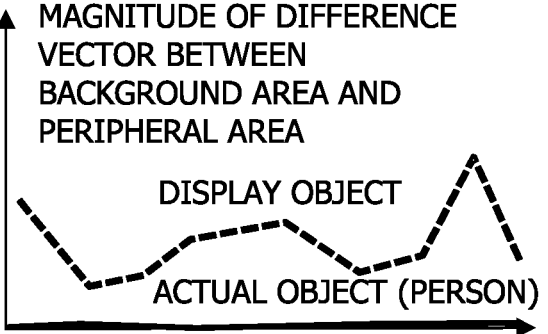
FIG. 2B is a diagram (part 2) for describing the states of synchronization and asynchronization of the motions of the respective image areas of the captured image in a case where the camera shake occurs at the time of image capturing.

In FIGS. 2A and 2B, a solid line graph represents behavior of magnitude of a difference vector for the captured image 10 obtained by capturing an actual person, and a broken line graph represents behavior of magnitude of a difference vector for the captured image 10 obtained by capturing a display object.

A horizontal axis in each of the graphs of FIGS. 2A and 2B represents an image capturing time of the captured image 10. In the graph of FIG. 2A, the magnitude of the difference vector between a motion vector representing a motion of the person area 12 and a motion vector representing a motion of the background area 13 is represented in a vertical axis direction. On the other hand, in the graph of FIG. 2B, the magnitude of the difference vector between a motion vector representing a motion of the peripheral area 11 and the motion vector representing the motion of the background area 13 is represented in the vertical axis direction.

In a case where the motions of the two areas in the captured image 10 are synchronized, the magnitude of the difference vector for the motions of the two areas decreases, and in a case where the motions of the two areas are not synchronized, the magnitude of the difference vector for the motions of the two areas increases.

In the graph of FIG. 2A, the magnitude of the difference vector for the captured image 10 obtained by capturing the display object is small, and the magnitude of the difference vector for the captured image 10 obtained by capturing the actual person is large. Therefore, it may be seen that the motions of the person area 12 and the background area 13 for the captured image 10 obtained by capturing the display object are substantially synchronized, while the motions of the person area 12 and the background area 13 for the captured image 10 obtained by capturing the actual person are not synchronized.

On the other hand, in the graph of FIG. 2B, the magnitude of the difference vector for the captured image 10 obtained by capturing the actual person is small, and the magnitude of the difference vector for the captured image 10 obtained by capturing the display object is large. Therefore, it may be seen that the motions of the peripheral area 11 and the background area 13 for the captured image 10 obtained by capturing the actual person are substantially synchronized, while the motions of the peripheral area 11 and the background area 13 for the captured image 10 obtained by capturing the display object are not synchronized.

In the present embodiment, focusing on such synchronization and asynchronization relationships between the motions of the respective image areas in the captured image 10 with blurring, it is determined whether or not the captured image 10 is obtained by capturing the display object according to a distribution situation of the motions of the respective positions included in the respective image areas.

Figure 3:
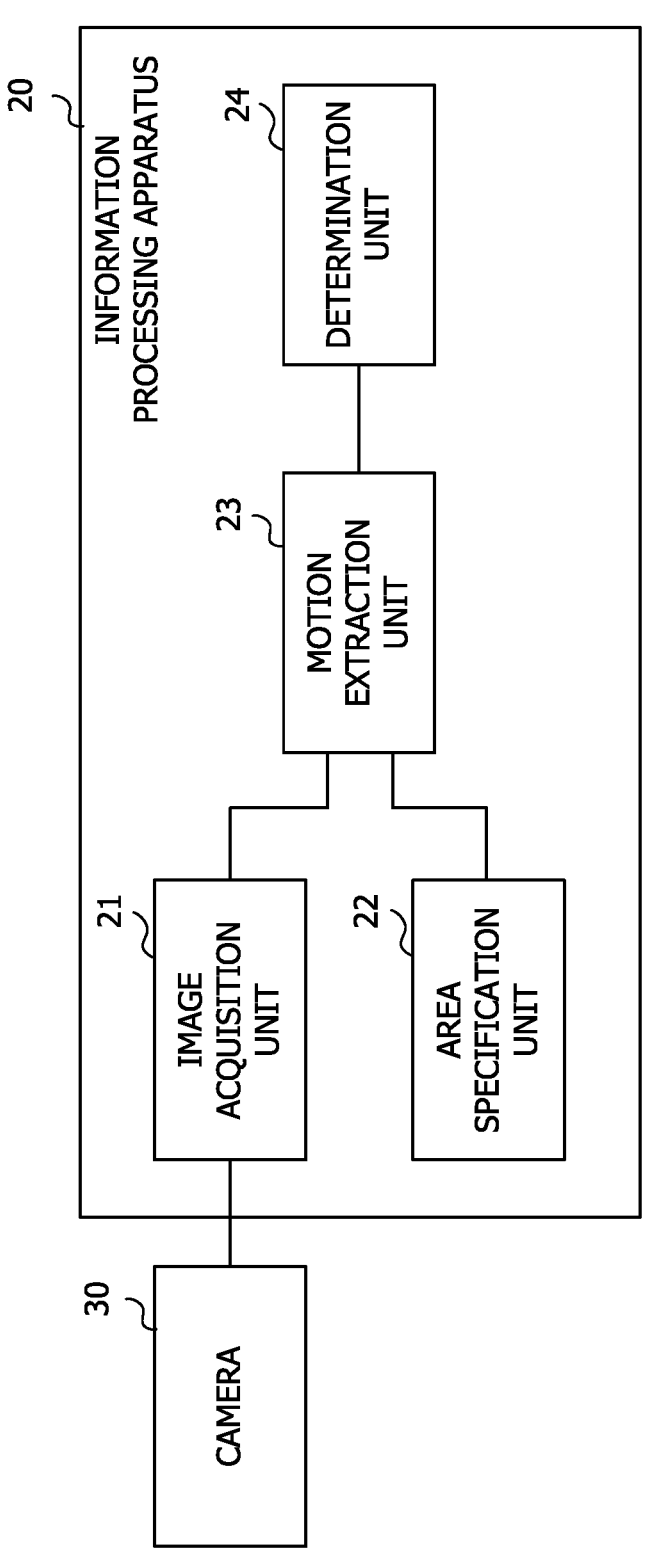
FIG. 3 is a diagram illustrating an exemplary configuration of an information processing apparatus.

Next, a configuration of an apparatus that determines whether or not the captured image 10 is obtained by capturing the display object of the person will be described. FIG. 3 illustrates an exemplary configuration of an information processing apparatus 20.

A camera 30 is coupled to the information processing apparatus 20. The camera 30 captures an image of an object to be captured and outputs the captured image 10. An original object to be captured of the camera 30 is a person, and for example, in a case where face authentication is performed, the camera 30 captures an image of a face of a person to be authenticated. Note that the camera 30 repeatedly captures the image of the object to be captured and outputs the time-series captured images 10. The time-series captured images 10 are used to extract a motion of each area of the captured images 10.

The information processing apparatus 20 includes, as components, an image acquisition unit 21, an area specification unit 22, a motion extraction unit 23, and a determination unit 24.

The image acquisition unit 21 acquires and stores the captured image 10 captured by the camera 30.

The area specification unit 22 specifies, from the captured image 10 acquired by the image acquisition unit 21, each of the image areas described with reference to FIG. 1, more specifically, the person area 12 and the areas other than the person area 12 (the peripheral area 11 and the background area 13).

The motion extraction unit 23 extracts a motion of each image area specified by the area specification unit 22 from the captured image 10, and acquires a distribution situation of a motion of each position included in each image area.

The determination unit 24 determines whether or not the captured image 10 is obtained by capturing a display object of a person according to a distribution situation of a motion of each position included in each image area, which is acquired by the motion extraction unit 23.

Note that the information processing apparatus 20 of FIG. 3 may be configured by a combination of a computer and software.

FIG. 4 illustrates a hardware configuration example of a computer 40.

The computer 40 includes, as components, for example, each piece of hardware of a processor 41, a memory 42, a storage device 43, a reading device 44, a communication interface 46, and an input/output interface 47. These components are coupled via a bus 48, and data may be mutually exchanged between the components.

The processor 41 may be, for example, a single processor, a multiprocessor, or a multicore processor. The processor 41 executes, for example, a captured image determination processing program describing a procedure of captured image determination processing to be described later by using the memory 42.

The memory 42 is, for example, a semiconductor memory, and may include a RAM area and a ROM area. The storage device 43 is, for example, a semiconductor memory such as a hard disk or a flash memory, or an external storage device. Note that the RAM is an abbreviation for random access memory. Furthermore, the ROM is an abbreviation for read only memory.

The reading device 44 accesses a removable storage medium 45 according to an instruction from the processor 41. The removable storage medium 45 is implemented by, for example, a semiconductor device (USB memory or the like), a medium to and from which information is input and output by magnetic action (magnetic disk or the like), a medium to and from which information is input and output by optical action (CD-ROM, DVD, or the like), or the like. Note that the USB is an abbreviation for universal serial bus. The CD is an abbreviation for compact disc. The DVD is an abbreviation for digital versatile disk.

The communication interface 46 transmits and receives data via a communication network (not illustrated) according to an instruction from the processor 41, for example.

The input/output interface 47 acquires various types of data such as image data of the captured image 10 transmitted from the camera 30. Furthermore, the input/output interface 47 outputs a result of the captured image determination processing to be described later output from the processor 41.

The program executed by the processor 41 of the computer 40 is provided in, for example, the following form.

(1) Installed in the storage device 43 in advance.

(2) Provided by the removable storage medium 45.

(3) Provided to the communication interface 46 from a server such as a program server via the communication network.

Note that the hardware configuration of the computer 40 is exemplary, and the embodiment is not limited to this. For example, a part or all of the functions of the functional units described above may be implemented as hardware including FPGA, SoC, and the like. Note that the FPGA is an abbreviation for field programmable gate array. The SoC is an abbreviation for system-on-a-chip.

Figure 5:
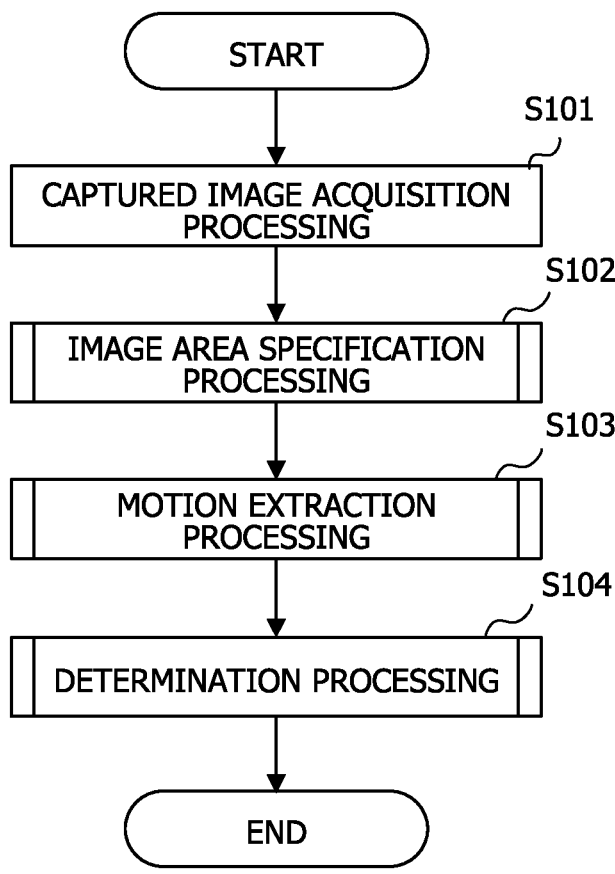
FIG. 5 is a flowchart illustrating processing contents of captured image determination processing.

Next, the captured image determination processing will be described. FIG. 5 is a flowchart illustrating processing contents of the captured image determination processing. In a case where the information processing apparatus 20 of FIG. 3 is configured by a combination of the computer 40 of FIG. 4 and software, the processor 41 is caused to execute a captured image determination program describing the captured image determination processing.

In FIG. 5, first, in S101, captured image acquisition processing is performed. In this processing, processing of acquiring, via the input/output interface 47, the time-series captured images 10 captured by the camera 30 and transmitted from the camera 30 and storing the acquired time-series captured images 10 in the memory 42 is performed. Note that, in the present embodiment, it is assumed that the outer periphery of the captured image 10 is a horizontally long rectangle. In the following description, it is assumed that a direction of a long side of the rectangle is a lateral direction of the captured image 10. Furthermore, it is assumed that a direction of a short side of the rectangle (a direction orthogonal to the lateral direction of the captured image 10) is a vertical direction of the captured image 10, a direction of a head of a person represented in the captured image 10 is an upward direction of the captured image 10, and a direction of a torso of the person is a downward direction of the captured image 10.

The processor 41 executes the processing in S101 to provide the function of the image acquisition unit 21 of FIG. 3.

Next, in S102, image area specification processing is performed. This processing is processing of specifying the person area 12 and the areas other than the person area 12 (the peripheral area 11 and the background area 13) from the captured image 10 acquired by the processing in S101. Details of this processing will be described later.

Next, in S103, motion extraction processing is performed. This processing is processing of extracting a motion of each image area specified by the processing in S102 from the captured image 10, and acquiring a distribution situation of a motion of each position included in each image area. Details of this processing will be described later.

Next, in S104, determination processing is performed. This processing is processing of extracting a motion of each image area specified by the processing in S102 from the captured image 10, and acquiring a distribution situation of a motion of each position included in each image area. Details of this processing will be described later.

When the processing in S104 ends, the captured image determination processing ends.

Figure 6:
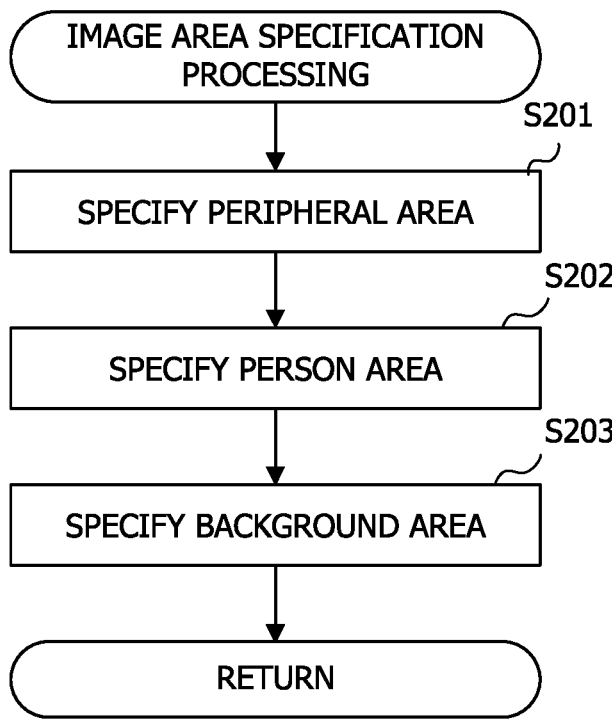
FIG. 6 is a flowchart illustrating processing contents of image area specification processing.

Next, details of the image area specification processing which is the processing in S102 of FIG. 5 will be described. FIG. 6 is a flowchart illustrating processing contents of the image area specification processing. The processor 41 executes the image area specification processing to provide the function of the area specification unit 22 of FIG. 3.

In FIG. 6, first, in S201, processing of specifying the peripheral area 11 in each of the time-series captured images 10 stored in the memory 42 is performed. In this processing, the area of the outer peripheral portion in the captured image 10, which is the annular area having the rectangular inner periphery with the edge of the rectangular captured image 10 as the outer periphery, is specified as the peripheral area 11.

Note that when a width of the annulus which is the peripheral area 11 is excessively widened, the other areas become narrower, and accuracy of determination of the captured image 10 may deteriorate conversely. Thus, it is preferable to set this width so as to obtain a value with which determination accuracy needed may be sufficiently obtained in advance by an experiment. Note that, in the present embodiment, the value of this width is set to 5% of a length of a horizontal width of the captured image 10.

Next, in S202, processing of specifying the person area 12 in each of the time-series captured images 10 stored in the memory 42 is performed. Many technologies are well known as technologies of specifying an area of a person from an image, and any of these well-known technologies may be used as the processing in S202.

For example, a technology called semantic segmentation for extracting a pixel corresponding to a person in an image is known. As a method of implementing the semantic segmentation, for example, a method using a convolutional neural network (CNN) is known. "Pyramid Scene Parsing Network" (PSPNet) proposed in Non-Patent Document 1 described above is an example of the method of implementing the semantic segmentation by using the CNN. As the processing in S202, the person area 12 may be specified from the areas surrounded by the inner periphery of the peripheral area 11 in the captured image 10 by using the PSPNet.

Furthermore, for example, a technology of detecting a rectangular area (also referred to as a bounding box) in which an object is represented from an image is known. Also as a method of implementing the detection of a rectangular area, the method using the CNN is known. For example, "Single Shot MultiBox Detector" (SSD) proposed in Non-Patent Document 2 described above and "You Only Look Once" (YOLO) proposed in Non-Patent Document 3 described above are examples of such a method of detecting a rectangular area by using the CNN. Furthermore, "Multitask Cascaded Convolutional Networks" (MTCNN) proposed in Non-Patent Document 4 described above is also an example of such a method of detecting a rectangular area, but this MTCNN is a method specialized for detecting an area of a face. As the processing in S202, the person area 12 may be specified from the areas surrounded by the inner periphery of the peripheral area 11 in the captured image 10 by using any of these technologies of detecting a rectangular area.

Figure 7A:
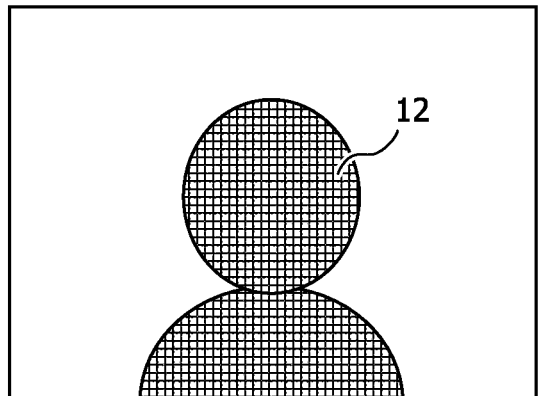
FIG. 7A is a diagram (part 1) for describing an example of a method of specifying a person area.
Figure 7B:
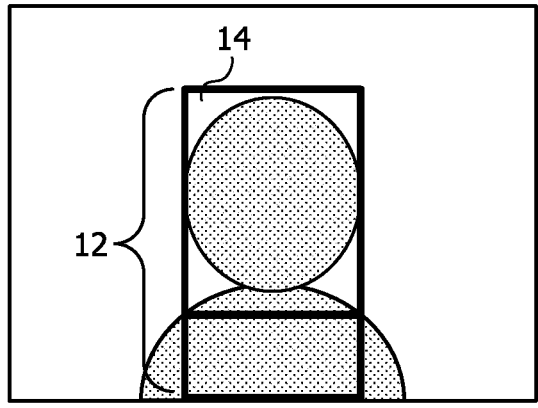
FIG. 7B is a diagram (part 2) for describing an example of the method of specifying the person area.

Note that, in a case where the specification is performed by using the semantic segmentation such as the PSPNet, an area representing a body part of a person including a head and a torso among the areas surrounded by the inner periphery of the peripheral area 11 is specified as the person area 12 as illustrated in FIG. 7A. On the other hand, in a case where a rectangular area is detected by the method such as the SSD, the YOLO, or the MTCNN, a rectangular area including the head of the person among the areas surrounded by the inner periphery of the peripheral area 11 is detected as a face area 14. In this case, as illustrated in FIG. 7B, it is preferable that an area included in a rectangle obtained by extending the rectangle of the face area 14 in the downward direction in the captured image 10 to a position contacting the inner periphery of the peripheral area 11 is specified as the person area 12, and a part of the body part of the person is also included in the person area 12.

The description of the flowchart of FIG. 6 will be continued. In S203 subsequent to S202, processing of specifying the background area 13 in each of the time-series captured images 10 stored in the memory 42 is performed. In this processing, a remaining area of the captured image 10 excluding the peripheral area 11 specified by the processing in S201 and the person area 12 specified by the processing in S202 is specified as the background area 13.

Figure 8:
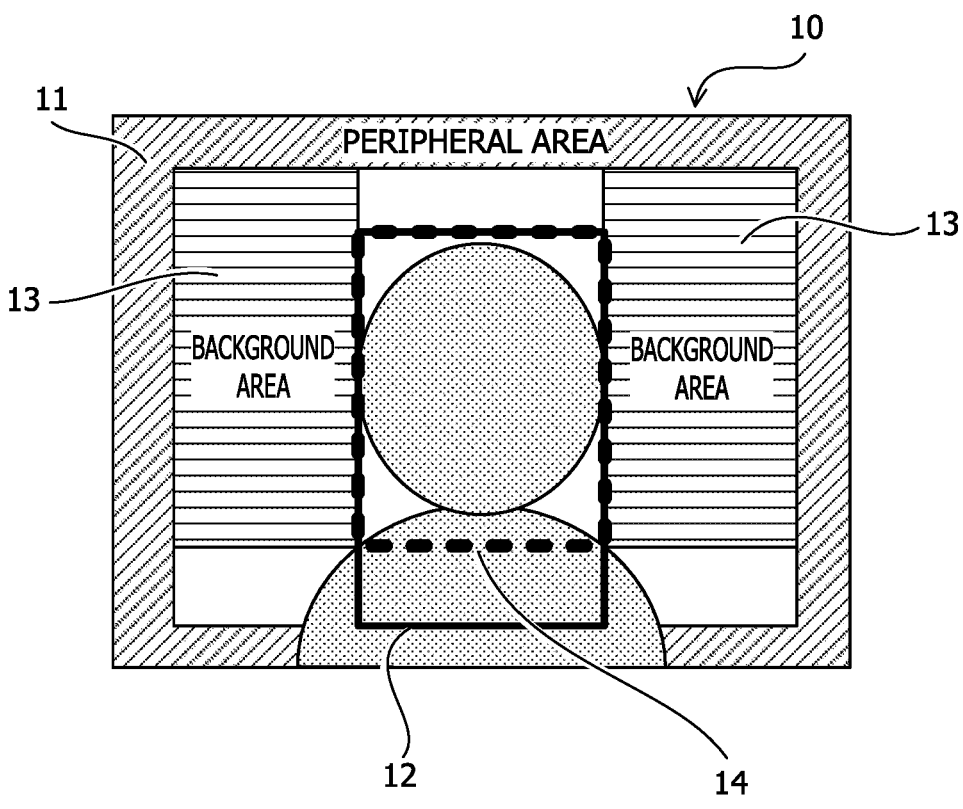
FIG. 8 is a diagram for describing an example of a method of specifying a background area.

Note that, in a case where the person area 12 is specified by extending the rectangle of the face area 14 in the downward direction of the captured image 10 in the processing in S202, when the entire remaining area is specified as the background area 13 as described above, a part (such as a shoulder portion) of the body of the person may be included in the background area 13. Therefore, in this case, as illustrated in FIG. 8, it is preferable that rectangular areas in contact with the inner periphery of the peripheral area 11 and the rectangle of the person area 12 in the lateral direction in the captured image 10 are specified as the background areas 13. Then, it is preferable that, in the background areas 13, ends in the downward direction in the captured image 10 is set to be equal in position in the downward direction to a side on a side in the downward direction in the rectangle of the face area 14. When the background area 13 is specified in this way, the area of the body of the person included in the background area 13 is reduced.

When the processing in S203 ends, the image area specification processing ends, and the processor 41 returns the processing to the captured image determination processing of FIG. 5.

The processing up to the above is the image area specification processing.

Figure 9:
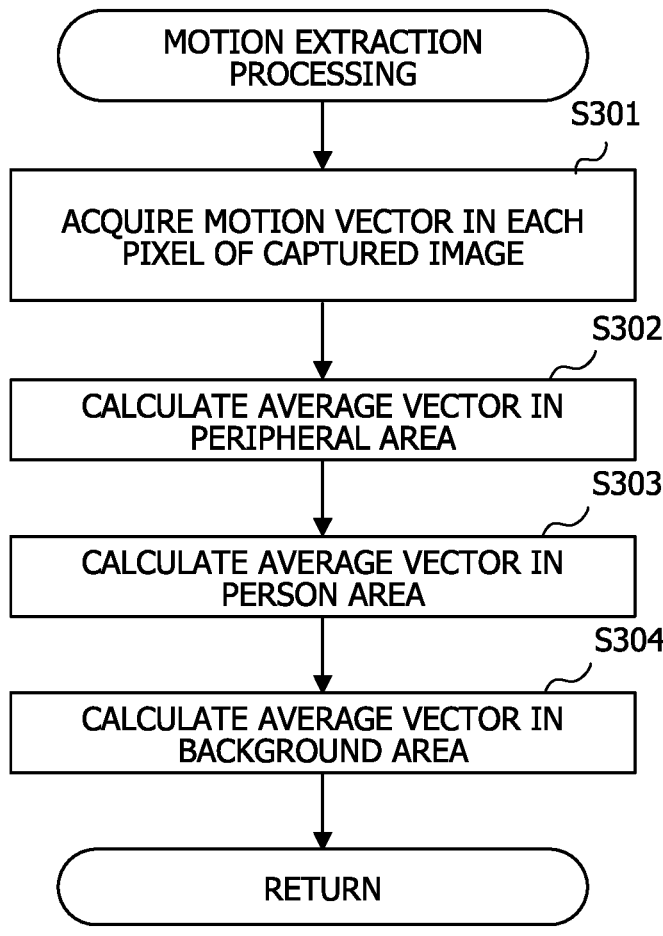
FIG. 9 is a flowchart illustrating processing contents of motion extraction processing.

Next, details of the motion extraction processing which is the processing in S103 of FIG. 5 will be described. FIG. 9 is a flowchart illustrating processing contents of the motion extraction processing. The processor 41 executes the motion extraction processing to provide the function of the motion extraction unit 23 of FIG. 3.

In FIG. 9, first, in S301, processing of acquiring a motion vector of an image in each pixel constituting the captured image 10 is performed. In this processing, the motion vector is extracted based on a change in luminance gradient in two of the time-series captured images 10 stored in the memory 42 by the processing in S101 of FIG. 5.

Many technologies are well known as technologies of extracting a motion vector of an image, and any of these well-known technologies may be used as the processing in S301. For example, as one of such technologies, a technology using an optical flow is widely known. As a method of calculating the optical flow, various methods such as association by a correlation (block matching method), association by a gradient method, and association using feature point tracking are known. A method proposed in Non-Patent Document 5 described above is also an example of the method of calculating the optical flow. As the processing in S301, a two-dimensional motion vector for the captured image 10 may be acquired for each pixel by using the optical flow calculated by using this method proposed in Non-Patent Document 5.

Next, in S302, processing of calculating an average vector for the peripheral area 11 is performed. In this processing, for each pixel of the captured image 10 included in the peripheral area 11, processing of calculating an average for all pixels of the motion vectors acquired by the processing in S301 is performed. An average vector vp calculated by this processing is an example of a motion vector representing a motion of a position included in the peripheral area 11.

The average vector vp for the peripheral area 11 of the captured image 10 is a two-dimensional vector. In the present embodiment, a component vpx of the average vector vp in the lateral direction (x direction) and a component vpy in the vertical direction (y direction) in the captured image 10 are each calculated by performing calculation of the following expression [Expression 1].

$$vpx = \left( \sum_{(i,j) \in Peripheral\ Area} vx(i,j) \right) / np \qquad \text{[Expression 1]}$$

-continued $$vpy = \left( \sum_{(i,j) \in \text{Peripheral Area}} vy(i,j) \right) / np$$

Note that, in the expression [Expression 1], vx(i, j) and v(i, j) are values of an x component and a y component of a motion vector for a pixel (pixel included in the peripheral area 11) specified at a position (i, j) on two-dimensional coordinates defined by the x direction and the y direction of the captured image 10, respectively. Furthermore, np is the number of pixels included in the peripheral area 11. That is, the expression [Expression 1] represents that each of the components vpx and vpy of the average vector vp is calculated by dividing each sum for each component of the x component and the y component of the motion vector for each pixel included in the peripheral area 11 by the number of pixels in the peripheral area 11.

Next, in S303, processing of calculating an average vector for the person area 12 is performed. In this processing, for each pixel of the captured image 10 included in the person area 12, processing of calculating an average for all pixels of the motion vectors acquired by the processing in S301 is performed. An average vector vf calculated by this processing is an example of a motion vector representing a motion of a position included in the person area 12. Note that a method of calculating the average vector vf for the person area 12 may be similar to the method of calculating the average vector vp for the peripheral area 11 described in the processing in S302.

Next, in S304, processing of calculating an average vector for the background area 13 is performed. In this processing, for each pixel of the captured image 10 included in the background area 13, processing of calculating an average for all pixels of the motion vectors acquired by the processing in S301 is performed. An average vector vb calculated by this processing is an example of a motion vector representing a motion of a position included in the background area 13. Note that a method of calculating the average vector vb for the background area 13 may also be similar to the method of calculating the average vector vp for the peripheral area 11 described in the processing in S302.

When the processing in S304 ends, the motion extraction processing ends, and the processor 41 returns the processing to the captured image determination processing of FIG. 5.

The processing up to the above is the motion extraction processing.

Note that, in the calculation of the average vector in each processing in S302, S303, and S304 of FIG. 9, a pixel for which only a slight motion is detected (magnitude of the motion vector is close to 0) may be included in the area subjected to the calculation of the average vector. For example, since a pixel in an area having uniform luminance has a small difference in luminance from peripheral pixels of the pixel, a change in luminance gradient is not observed, and thus, only a slight motion may be detected although there is correctly a great motion. Accuracy of the average vector calculated by using the motion vector for such a pixel as a vector representing the motion of the area subjected to the calculation may be deteriorated. Therefore, a pixel for which the magnitude of the motion vector acquired in the processing in S301 is smaller than a predetermined value may be excluded from the pixels used for the calculation of the average vector.

Furthermore, in the flowchart of FIG. 9, the motion vector of the image in each pixel constituting the captured image 10 is acquired by the processing in S301, and the average vector of the pixels included in each area is calculated for each area by the subsequent processing in S302, S303, and S304. Alternatively, the captured image 10 may be divided into the respective areas, and thereafter, the motion vector of the image in each pixel included in the divided captured image 10 may be acquired, and then the average vector may be calculated for each area.

Figure 10:
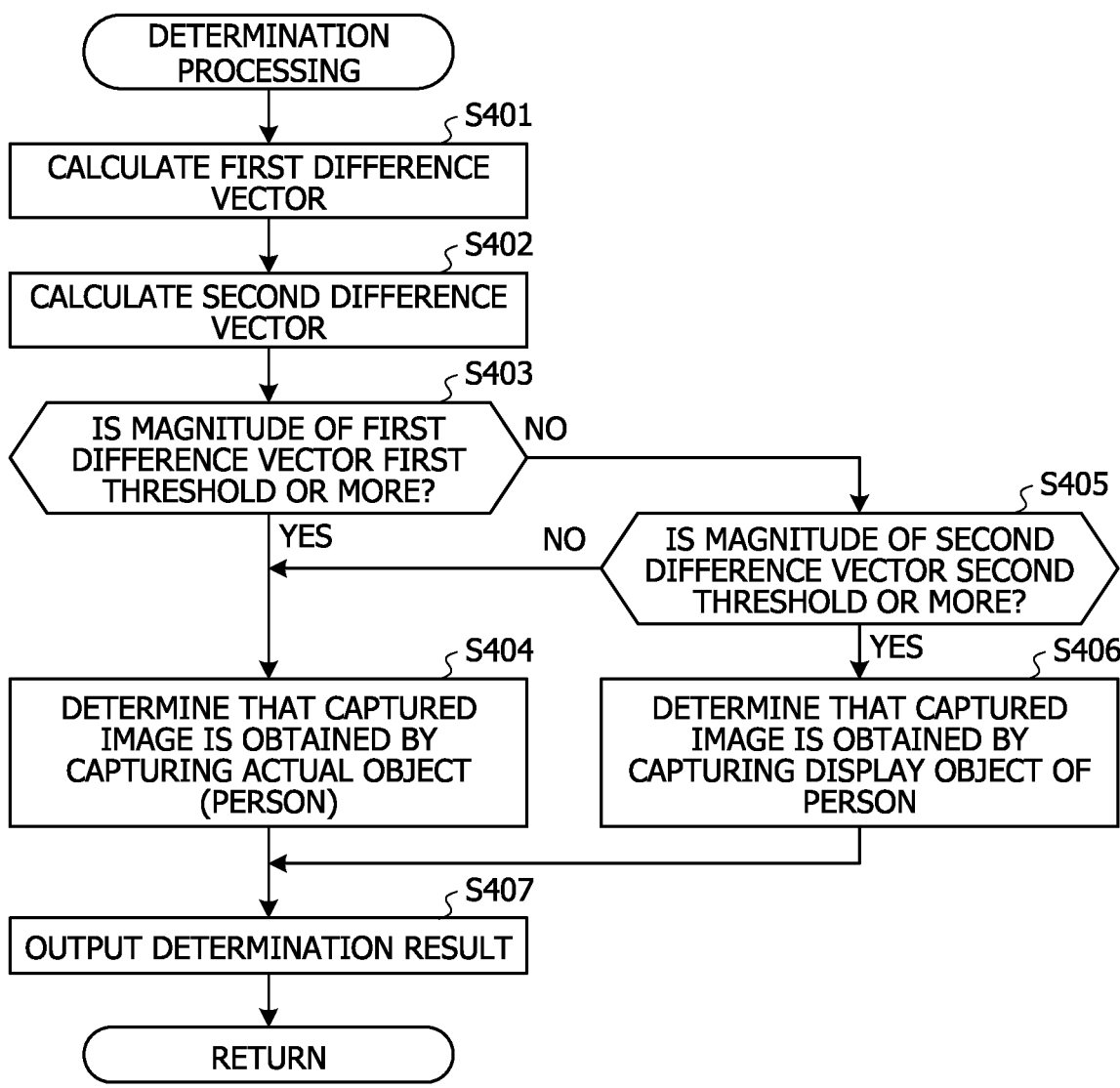
FIG. 10 is a flowchart illustrating processing contents of determination processing.

Next, details of the determination processing which is the processing in S104 of FIG. 5 will be described. FIG. 10 is a flowchart illustrating processing contents of the determination processing. The processor 41 executes the determination processing to provide the function of the determination unit 24 of FIG. 3.

In FIG. 10, first, in S401, processing of calculating a first difference vector is performed. A first difference vector vdiff1 is a difference between the motion vector representing the motion of the position included in the person area 12 and the motion vector representing the motion of the position included in the background area 13, and each is calculated by performing calculation of the following expression [Expression 2] in the present embodiment.

$$vdiff1 = vf - vb = (vfx - vbx, vfy - vby) \tag{2}$$

Note that, in the expression [Expression 2], vf and vb are average vectors for the person area 12 and the background area 13, respectively. Furthermore, vfx and vfy are values of an x component and a y component of the average vector vf for the person area 12, respectively, and vbx and vby are values of an x component and a y component of the average vector vb for the background area 13, respectively.

The first difference vector vdiff1 calculated in this way is an example of an index representing a difference between the motion of the position included in the background area 13 and the motion of the position included in the person area 12, and is an example of representation of a distribution situation of the motions of the two positions.

Next, in S402, processing of calculating a second difference vector is performed. A second difference vector vdiff2 is a difference between the motion vector representing the motion of the position included in the background area 13 and the motion vector representing the motion of the position included in the peripheral area 11, and each is calculated by performing calculation of the following expression [Expression 3] in the present embodiment.

$$vdiff2 = vb - vp = (vbx - vpx, vby - vpy)$$

Note that, in the expression [Expression 3], vb and vp are average vectors for the background area 13 and the peripheral area 11, respectively. Furthermore, vbx and vby are values of the x component and the y component of the average vector vb for the background area 13, respectively, and vpx and vpy are values of an x component and a y component of the average vector vp for the peripheral area 11, respectively.

The second difference vector vdiff2 calculated in this way is an example of an index representing a difference between the motion of the position included in the background area 13 and the motion of the position included in the peripheral area 11, and is an example of representation of a distribution situation of the motions of the two positions.

Next, in S403, processing of determining whether or not magnitude of the first difference vector vdiff1 calculated by the processing in S401 is a first threshold or more is performed.

The magnitude of the first difference vector vdiff1 is calculated by calculating a square root of a sum of squares of a value of an x component and a value of a y component for the first difference vector vdiff1.

The first threshold is a value set in advance. For example, magnitude of the average vector vb for the background area 13 in the captured image 10 including blurring for a display object of a person, which is captured while shaking the camera 30, is estimated in advance by a plurality of experiments, and a value of about ½ of the obtained estimation value is set as the first threshold.

In the processing in S403, when it is determined that the magnitude of the first difference vector vdiff1 is the first threshold or more (when a determination result is YES), the motion of the background area 13 and the motion of the person area 12 are considered to be asynchronous, and the processing proceeds to S404.

In S404, processing of determining that the captured image 10 is obtained by capturing an actual person as a result of the determination processing in FIG. 10 is performed.

On the other hand, in the processing in S403, when it is determined that the magnitude of the first difference vector vdiff1 is smaller than the first threshold (when the determination result is NO), the processing proceeds to S405.

In S405, processing of determining whether or not magnitude of the second difference vector vdiff2 calculated by the processing in S402 is a second threshold or more is performed.

The magnitude of the second difference vector vdiff2 is calculated by calculating a square root of a sum of squares of a value of an x component and a value of a y component for the second difference vector vdiff2.

The second threshold is a value set in advance. For example, magnitude of the average vector vb for the background area 13 in the captured image 10 including blurring for a display object of a person, which is captured while shaking the camera 30, is estimated in advance by a plurality of experiments, and a value of about ½ of the obtained estimation value is set as the second threshold.

In the processing in S405, when it is determined that the magnitude of the second difference vector vdiff2 is the second threshold or more (when a determination result is YES), the motion of the background area 13 and the motion of the peripheral area 11 are considered to be asynchronous, and the processing proceeds to S406.

In S406, processing of determining that the captured image 10 is obtained by capturing a display object of a person as a result of the determination processing in FIG. 10 is performed.

On the other hand, in the processing in S405, when it is determined that the magnitude of the second difference vector vdiff2 is smaller than the second threshold (when the determination result is NO), the motion of the background area 13 and the motion of the peripheral area 11 are considered to be synchronous, and the processing proceeds to S404. Therefore, in S404, processing of determining that the captured image 10 is obtained by capturing an actual person as a result of the determination processing in FIG. 10 is performed.

When the processing in S404 or the processing in S406 ends, the processing proceeds to S407. In S407, processing of outputting the result of the determination made by the processing in S404 or the processing in S406 from the input/output interface 47 as a processing result of the captured image determination processing of FIG. 5 is performed.

When the processing in S407 ends, the determination processing ends, and the processor 41 returns the processing to the captured image determination processing of FIG. 5.

The processing up to the above is the determination processing.

When the processor 41 executes the captured image determination processing described above, the computer 40 of FIG. 4 operates as the information processing apparatus 20 of FIG. 3, and it is possible to accurately determine whether or not the captured image 10 is obtained by capturing a display object of a person.

While the disclosed embodiment and the advantages thereof have been described above in detail, those skilled in the art will be able to make various modifications, additions, and omissions without departing from the scope of the present invention as explicitly set forth in the claims.

Figure 11:
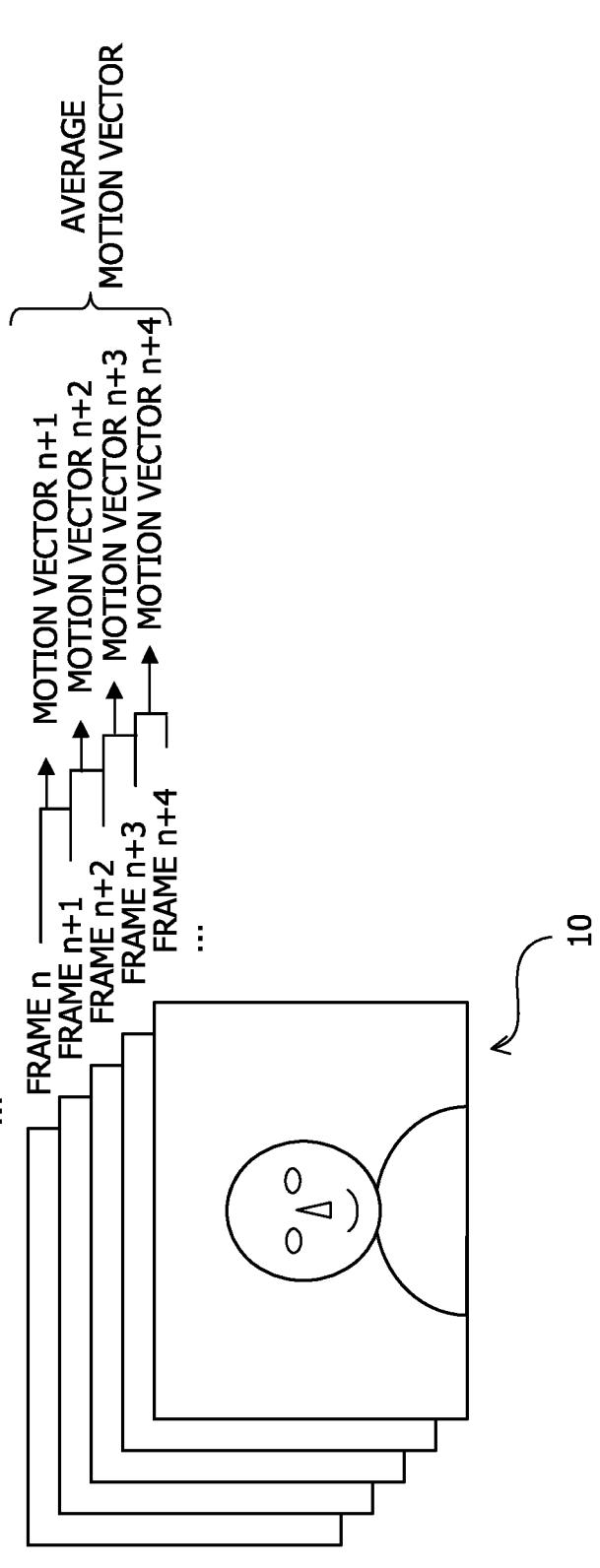
FIG. 11 is a diagram for describing an example of acquiring motion vectors of images by using a plurality of pairs of captured images.

For example, in the processing in S301 in the motion extraction processing of FIG. 9, the motion vector of the image in each pixel constituting the captured image 10 is acquired by using two of the time-series captured images 10. Alternatively, as exemplified in FIG. 11, by using a plurality of pairs of the captured images 10 including two of the time-series captured images 10, a motion vector for each pixel may be acquired for each pair, and an average of the plurality of obtained motion vectors may be used as the motion vector for each pixel. Note that FIG. 11 represents an example in which a motion vector of each pixel is acquired for each of four pairs of the captured images 10, and an average motion vector of the obtained four motion vectors is calculated for each pixel, to acquire a motion vector of an image in each pixel constituting the captured image 10. With this configuration, accuracy of an acquired motion vector of an image is improved.

Furthermore, in the case where an average of motion vectors obtained for each pair of the time-series captured images 10 is calculated as a motion vector of an image for each pixel as described above, a moving average may be calculated.

Moreover, in the case where the average of the motion vectors obtained for each pair of the time-series captured images 10 is calculated, since an area of each area is different for each frame of the captured image 10, a weighted average according to the area of each area may be calculated.

Furthermore, in the example of FIG. 11, four pairs are configured by setting two adjacent frames as one pair among the captured images 10 of five frames continuous in time series. Alternatively, for example, the two frames constituting one pair may be two frames with some frames interposed therebetween, instead of the two adjacent frames. With this configuration, a difference in the image between the two frames constituting one pair increases, and thus, for example, even when the camera 30 performs image capturing at a very high frame rate, a motion of the detected image may be stable.

Note that, in the embodiment described above, it is assumed that a general camera is used as the camera 30 coupled to the information processing apparatus 20 of FIG. 3. Note that, even when the captured image 10 is a grayscale image, a motion vector of the image may be acquired. Therefore, an infrared camera or a depth camera capable of outputting a grayscale image may be used as the camera 30.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A determination method for a computer to execute a process comprising:

acquiring a captured image that is captured by a camera and includes an image area of a person;

specifying an image area other than the image area of the person from the acquired captured image; and determining whether the captured image is obtained by capturing a display object of the person according to a distribution of motions of a plurality of positions included in the specified image area, wherein the image area other than the image area of the person includes a peripheral area that is an annular area that has an edge of the captured image as an outer periphery, and a background area that is an area other than the image area of the person among areas surrounded by an inner periphery of the peripheral area, and the determining includes determining according to a distribution of motions of a first position included in the background area and a distribution of motions of a second position included in the peripheral area.

2. The determination method according to claim 1, wherein the determining includes determining based on a difference between the motion of the first position and the motion of the second position.

3. The determination method according to claim 2, wherein the process further comprising:

acquiring, as a first motion vector, an average of motion vectors of each of pixels of the captured image included in the background area; and acquiring, as a second motion vector, an average of motion vectors of each of pixels of the captured image included in the peripheral area, wherein the determining includes determining based on magnitude of a difference vector between the first motion vector and the second motion vector.

4. The determination method according to claim 3, wherein the determining that the captured image is obtained by capturing the display object of the person when the magnitude of the difference vector is greater than a certain threshold.

5. The determination method according to claim 1, wherein the process further comprising performing first determination to determine whether the captured image is obtained by capturing the person according to a distribution of motions of the first position and a third position included in the image area of the person, wherein the determining whether the captured image is obtained by capturing the display object of the person includes determining when a result of the first determination is that the captured image is not obtained by capturing the person.

6. The determination method according to claim 5, wherein the first determination includes determining based on a difference between the motion of the first position and the motion of the third position.

7. The determination method according to claim 6, wherein the process further comprising:

acquiring, as a first motion vector, an average of motion vectors of each of pixels of the captured image included in the background area; and acquiring, as a third motion vector, an average of motion vectors of each of pixels of the captured image included in the image area of the person, wherein the first determination includes determining based on magnitude of a difference vector between the first motion vector and the third motion vector.

8. The determination method according to claim 7, wherein the determining includes determining that the captured image is obtained by capturing the person when the magnitude of the difference vector is greater than a certain threshold in the first determination.

9. The determination method according to claim 1, wherein the inner periphery of the peripheral area is a rectangle, and the image area of the person is a rectangular area obtained by extending a rectangle that includes an area of a face of the person in a downward direction as a direction from a head of the person toward a torso of the person to a position that contacts the inner periphery of the peripheral area.

10. The determination method according to claim 9, wherein the background area is a rectangular area that contacts the inner periphery of the peripheral area and the extended rectangle in a lateral direction orthogonal to the downward direction, and an end in the downward direction in the background area is equal in position in the downward direction to a side on a side in the downward direction in the rectangle that includes the area of the face of the person before the extension.

11. A non-transitory computer-readable storage medium storing a determination program that causes at least one computer to execute a process, the process comprising:

acquiring a captured image that is captured by a camera and includes an image area of a person;

specifying an image area other than the image area of the person from the acquired captured image; and determining whether the captured image is obtained by capturing a display object of the person according to a distribution of motions of a plurality of positions included in the specified image area, wherein the image area other than the image area of the person includes a peripheral area that is an annular area that has an edge of the captured image as an outer periphery, and a background area that is an area other than the image area of the person among areas surrounded by an inner periphery of the peripheral area, and the determining includes determining according to a distribution of motions of a first position included in the background area and a distribution of motions of a second position included in the peripheral area.

12. An information processing apparatus comprising:

one or more memories; and one or more processors coupled to the one or more memories and the one or more processors configured to:

acquire a captured image that is captured by a camera and includes an image area of a person, specify an image area other than the image area of the person from the acquired captured image, and determine whether the captured image is obtained by capturing a display object of the person according to a distribution of motions of a plurality of positions included in the specified image area, wherein the image area other than the image area of the person includes a peripheral area that is an annular area that has an edge of the captured image as an outer periphery, and a background area that is an area other than the image area of the person among areas surrounded by an inner periphery of the peripheral area, and the determining includes determining according to a distribution of motions of a first position included in the background area and a distribution of motions of a second position included in the peripheral area.

* * * * *